G. W. COLLIN.
REGULATING VALVE.
APPLICATION FILED MAR. 23, 1912.
1,050,808.
Patented Jan. 21, 1913.
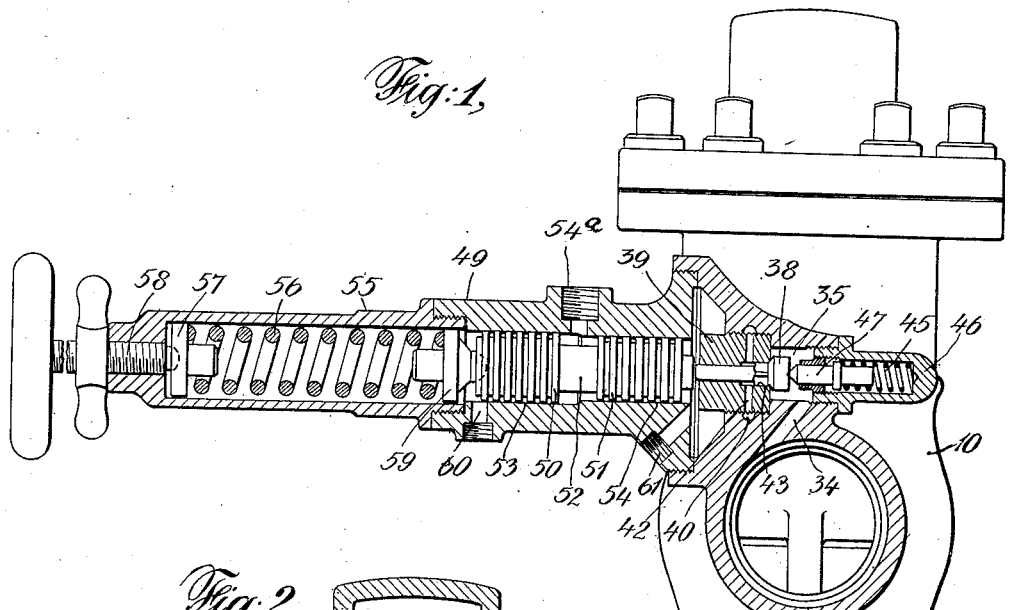
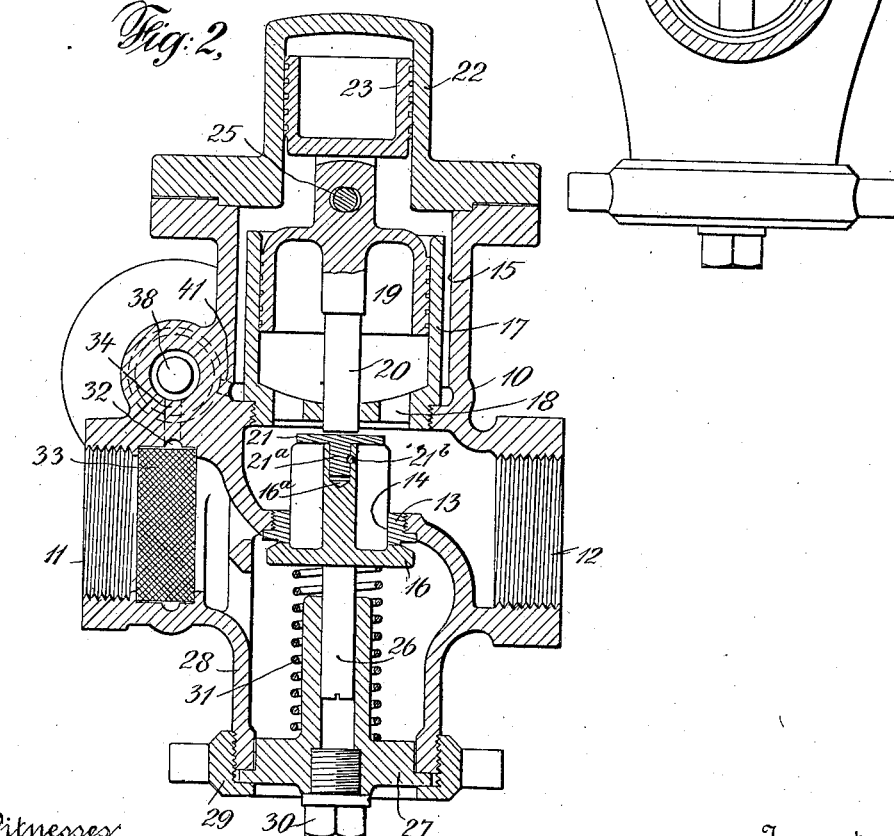

UNITED STATES PATENT OFFICE.

GEORGE W. COLLIN, OF BRIDGEPORT, CONNECTICUT, ASSIGNOR TO THE COLLIN VALVE COMPANY, OF BRIDGEPORT, CONNECTICUT, A CORPORATION OF MAINE.

REGULATING-VALVE.

1,050,808. Specification of Letters Patent. Patented Jan. 21, 1913.

Application filed March 23, 1912. Serial No. 685,714.

*To all whom it may concern:*

Be it known that I, GEORGE W. COLLIN, a citizen of the United States of America, and a resident of Bridgeport, county of Fairfield, and State of Connecticut, have invented certain new and useful Improvements in Regulating-Valves, of which the following is a specification.

My invention relates to improvements in regulating valves, and particularly in fluid-pressure-controlled valves, designed for regulating the operation of steam and compressed air pumps and the like.

The valve herein described is particularly adapted for use where the fluid pressure, controlling the action of the valve, is exceedingly high, and comprises the adaptation of pilot-valve-controlled regulating valves, such as shown for example in my Patent No. 949,294, dated February 15, 1910, and my application Serial No. 653,802, filed October 10, 1911, for the control of steam and compressed air pumps and the like.

The object of my invention is to provide a simple and reliable regulating valve adaptable for control by fluid pressure, and particularly for control by relatively small variations of very high pressures, and adapted to control steam pumps and the like.

I will now proceed to describe my invention with reference to the accompanying drawings, and will then point out the novel features in claims.

In the drawings: Figure 1 shows an elevation and partial section of my improved regulating valve, the section being taken through the axis of the pilot valve chamber and the fluid-pressure-actuated operating device of the pilot valve. Fig. 2 shows a central vertical section of the valve through the main axis thereof, the plane of section being taken at right angles to that of Fig. 1.

In said drawings 10 designates the main valve body, 11 the inlet thereof and 12 the outlet thereof. The inlet and outlet, as shown are threaded in the usual manner for connection to steam pipes and the like. The casing is shown as provided with the usual ported division wall separating the inlet and outlet chambers of the valve body, and includes a transverse ported portion in which is removably secured a ported valve seat bushing 13. Numeral 14 designates the port of this bushing, which is the main valve port. 16 designates the main valve for closing this port 14.

On the outlet side of the valve, but with its axis preferably in line with the axis of the valve port 14, there is a piston chamber 15, provided with a liner 17 having suitable openings 18 whereby the interior of said liner is connected with the outlet chamber of the valve body. The bore of this liner 17 is smoothly finished to receive the piston 19, said piston being designed to move axially in said liner. Said piston is provided with a stem 20, passing through a suitable guide opening in the inner end of the liner 17, and this stem at its end bears against a plate 21 provided on the outlet side of the valve 16. Said plate 21 is secured to the valve 16 by means of a stem 21$^a$ fitting within a socket 16$^a$ of the valve, and a key 21$^b$ engaging the steam 21$^a$ and the side of the socket 16$^a$. This construction insures centering of the plate 21 with respect to the valve, and the formation of plate 21 as a member separate from, but secured to, the valve 16, greatly facilitates the manufacture of said valves.

At its outer end the piston chamber 15 is provided with a removable hollow end cap 22, having within it a cushion cylinder in which works a cushion piston 23 having a laterally free pivotal connection to piston 19, 25 being the pivot pin. The pivotal connection between the cushion piston and the piston 19 allows each piston to follow freely its respective bore so that no cramping of either piston may occur. The main valve 16 is provided with a centrally projecting stem 26 fitted to move in the bore of a guide 27 seated in the end of the extension 28 of the valve body. This guide 27 is normally held in position by a nut 29, screwing upon the end of the extension 28 of the valve body. The head portion of the guide 27 is made with slight clearance with respect to the bore of extension 28 so that slight lateral motion of the guide 27 in said bore is permitted; this clearance being greatly exaggerated in Fig. 2 for clearness of illustration. This construction, comprising a guide 27 structurally separate from the valve body and held thereto by a fastening such as nut 29 which permits slight lateral motion of the guide 27 before the nut 29 has been screwed home, permits alinement of the guide 27 with respect to the valve stem 26 without interfering with independent alinement of valve 16 with respect to its valve seat, and so obviates cramping of stem 26 in guide 27 on the one hand, or cramping of valve 16 in port 14 on the other hand.

The end of the valve extension 26 has a key slot formed in it whereby a screw driver or other suitable tool may be introduced into the bore of guide 27 to rotate the valve 16 for guiding said valve to its seat, or for any other purpose. A plug 30 normally closes the end of the bore of the guide 27.

I customarily provide a spring 31 surrounding the guide 27 and bearing against the base of the said guide, and against the valve 16, which spring tends to hold said valve seated; however, I have also provided said valve 16 with plate 21 whereby, even if said spring 31 be omitted from the valve, or if said spring should break or should loose strength so that the valve 16 drops wide open when pressure is cut off, when fluid under pressure is admitted through the valve inlet 11, the rush of said fluid under pressure through the port 14, acting upon plate 21, will tend to shut the valve; while when the valve is shut the pressure of the fluid behind it tends to hold it closed.

33 designates a cylindrical strainer located in the inlet chamber of the valve body over an annular recess 32 in the wall of said inlet chamber, from which annular recess a port 34, leads to chamber 35 of the pilot valve. This chamber 35 is located to one side of the main chamber of the valve body, and such pilot valve chamber 35 terminates at both ends in the exterior surface of the valve body, being closed at both ends by suitable removable closing means hereinafter described.

38 designates a pilot valve, and 39 designates a removable bushing, containing a valve seat for the pilot valve, and an interior bore within which is located the stem of the pilot valve, said bushing screwing into an enlarged portion of the pilot valve chamber 35. An annular groove 40 is provided in the wall of the portion of the pilot valve chamber into which this bushing 39 screws, and a port 41 (see Fig. 2) leads from this groove 40 to the piston chamber 15 in rear of the piston 19. Several radial ports 42 connect the bore 43 of the valve seat bushing 39 with the annular groove 40. The inner end of the bushing 39 abuts tightly against a shoulder of the pilot valve chamber as clearly shown in Fig. 1, and therefore a tight joint is formed at this shoulder, between the valve seat bushing and the walls of the pilot valve chamber, thereby obviating leakage of steam or other fluid past the end portion of the valve seat bushing into port 40. Since the radial ports 42 of the valve seat bushing emerge in the threaded portion of that bushing, and since the port 41 is also located in the threaded portion of the valve seat chamber, and since it is easy to so thread said seat bushing, and the corresponding portion of the pilot valve chamber, that a tight joint is formed between said bushing and the walls of said chamber, leakage of steam or other fluid between the valve seat bushing and the walls of the pilot valve chamber is obviated.

As so far described, the valve is substantially identical with the valve illustrated in my said application Serial No. 653,802, and it will be clear that the operation of the valve, as so far described, is as follows: Supposing the pilot valve 38 to be seated and valve 16 to be seated also, piston 19 being in its upper position therefore, if pilot valve 38 be opened by any suitable means, such as the means hereinafter described, fluid admitted to pilot valve chamber 35, from the inlet chamber of the valve body, through port 34, will pass through ports 42, groove 40 and port 41 to the upper side of piston 19, forcing said piston 19 downward against the necessarily less pressure in the outlet side of the valve body, and so opening valve 16. When pilot valve 38 is permitted to close, (the pin 47 carried by the cap 46 closing one end of the pilot valve chamber, and pressed against the head of the pilot valve of the spring 45 within said cap, tends to close said pilot valve), the pressure behind piston 19 decreases, owing to condensation or leakage, and the pressure of the fluid in the discharge chamber of the valve body acting through ports 18 against the inner face of the piston 19, moves said piston outward, whereupon valve 16 is closed by spring 31, or by action of the steam or other fluid passing through valve port 14, on plate 21.

For regulating the opening and closing of the pilot valve 38 I provide a differential piston having two piston-heads, 50 and 51, connected by a reduced neck-portion 52, said piston working within corresponding cylinders 53 and 54 of a bonnet 49 which closes the larger end of the pilot valve chamber 35; which bonnet is provided, between cylinders 53 and 54, with a fluid-pressure inlet 54ᵃ. The outer end of the bonnet 49 is closed by a spring-case 55, having within it a loading spring 56, acting at one end against a bearing piece 57 normally resting against the end of an adjusting screw 58, mounted in the end of the spring case 55. At its other end, the spring 56 bears against a bearing piece 59 having a ball end bearing against the outer end of piston 50—51—52. It will be obvious that by turning the screw 58, the pressure exerted by the spring 56 upon the piston 50—51—52 may be varied. The pressure so exerted by the spring 56 is counteracted by pressure exerted by the fluid within bonnet 49 against piston head 50. This fluid, of course, also acts upon piston head 51, but the effective area of piston head 50 being slightly greater than the effective area of piston head 51, there is an effective difference of pressure, pressing the differential piston 50—51—52, outward against the thrust of spring 56.

I am aware that heretofore pilot-valve-controlled regulating valves have been devised wherein the pilot valve is operated by a piston acted upon in one direction by fluid pressure and in the opposite direction by a spring. But where the pressures of the controlling fluid are very high, and it is desired that the valve shall operate with relatively small variations of pressure of such high pressure fluid, such former valves have required excessively strong and stiff loading springs to counterbalance the excessive thrust of the piston, it being impracticable to make these pistons extremely small. By employing a differential piston 50—51—52, I am able to use a piston of practicable diameter, and at the same time to employ a relatively light loading spring 56; for the difference in diameter of the two heads of the differential piston may be extremely small; for example, in the case of a valve designed to work with water pressure of or about 5000 pounds per square inch, the head 50 may be one and one sixteenth inches in diameter and piston 51 may be of one inch diameter, the effective difference of piston area being then .1012 square inches, giving an end thrust on the piston of about 100 pounds per 1000 pounds of pressure; and it is easy to obtain compact loading springs giving corresponding pressures against the piston.

The bonnet 49 is provided with leakage-connections 60 and 61 for the escape of any fluid which may leak past the two piston heads.

In my application Serial No. 653,802, above mentioned, I have claimed the cushioning means for the valve-actuating piston 19, herein illustrated, the closure 46 and the means carried thereby tending to hold the pilot valve closed, and the removable valve seat bushing 39 carrying the pilot valve; therefore, such features are not claimed herein.

What I claim is:—

1. A regulating valve such as described, comprising in combination a main valve body having inlet and outlet connections with a ported division wall therebetween, a main valve for closing the port of such division wall, fluid-pressure-operated means regulating the opening and closing of such main valve, a pilot valve controlling such fluid-pressure-operated main-valve-actuating means, and fluid-pressure-controlled means for controlling such pilot valve, comprising a differential cylinder the two portions of which are of different, but nearly the same, diameter and a differential piston therein, said piston having two heads one of which has a diameter corresponding to that of one of said portions of the differential cylinder, and the other of which has a diameter corresponding to the other of said portions of the cylinder, the cylinder having means for admitting fluid under pressure to the space between said piston heads, and loading means opposing the predominant fluid-pressure exerted by the fluid within such cylinder, on the differential piston.

2. A regulating valve such as described, comprising in combination a main valve body having inlet and outlet connections with a ported division wall therebetween, a main valve for closing the port of such division wall, fluid-pressure-operated means regulating the opening and closing of such main valve, a pilot valve controlling such fluid-pressure-operated main-valve-actuated means, and fluid-pressure-controlled means for controlling such pilot valve, comprising a differential cylinder the two portions of which are of different, but nearly the same, diameter and a differential piston therein, said piston having two heads one of which has a diameter corresponding to that of one of said portions of the differential cylinder, and the other of which has a diameter corresponding to the other of said portions of the cylinder, the cylinder having means for admitting fluid under pressure to the space between said piston heads, and loading means opposing the predominant fluid-pressure exerted by the fluid within such cylinder, on the differential piston, said cylinder provided with leakage-escape means beyond the heads of said pistons.

3. A regulating valve such as described, comprising in combination a main valve body having inlet and outlet connections with a ported division wall therebetween, a main valve for closing the port of such division wall, fluid-pressure-operated means regulating the opening and closing of such main valve, a pilot valve controlling such fluid-pressure-operated main-valve-actuated means, said valve body having a pilot valve chamber in which the pilot valve is located, and fluid-pressure-operated means for operating such pilot valve, comprising a differential cylinder, forming a bonnet for such pilot valve chamber, said cylinder comprising two portions of different, but nearly the same, diameter, and a piston within said cylinder having two heads one having a diameter corresponding to that of one of said portions of the cylinder, the other having a diameter corresponding to that of the other of said portions of the cylinder, said cylinder provided with means for admitting fluid under pressure to the space between said piston heads, and loading means arranged to oppose the predominant thrust of the fluid under pressure, on such differential piston.

4. A regulating valve such as described comprising in combination a main valve body having inlet and outlet connections with a ported division wall therebetween, a main valve for closing the port of such division wall, fluid-pressure-operated means regulating the opening and closing of such main valve, a pilot valve controlling such fluid-pressure-operated main-valve-actuated means, and fluid-pressure-controlled means for controlling such pilot valve, comprising a differential cylinder the two portions of which are of different, but nearly the same, diameter and a differential piston therein, said piston having two heads one of which has a diameter corresponding to that of one of said portions of the differential cylinder, and the other of which has a diameter corresponding to the other of said portions of the cylinder, the cylinder having means for admitting fluid under pressure to the space between said piston heads, and loading means opposing the predominant fluid-pressure exerted by the fluid within such cylinder, on the differential piston comprising a spring case closing the larger end of said cylinder, a loading spring therein, a screw mounted in the end of said spring case, for regulating the pressure exerted by said spring, a bearing piece between said screw and spring, and a bearing piece between said spring and differential piston, the latter bearing piece having a ball-end abutting against the piston.

5. A fluid-pressure-control attachment for pilot-valve-controlled regulating valves, comprising a differential cylinder comprising two cylinder portions having different but nearly the same diameter, a differential piston within said cylinder having two heads, one of a diameter corresponding to one of the cylinder portions of said differential cylinder, the other of a diameter corresponding to that of the other portion of said differential cylinder, said differential cylinder being open at one end and adapted to be secured at that end to a regulating valve, a spring casing secured to the other end of said cylinder, and a loading spring within said spring case, and arranged to act against said piston.

6. A fluid-pressure-controlled attachment for pilot-valve-controlled regulating valves, comprising a differential cylinder comprising two cylinder portions having different but nearly the same diameter, a differential piston within said cylinder having two heads, one of a diameter corresponding to one of the cylinder portions of said differential cylinder, the other of a diameter corresponding to that of the other portion of said differential cylinder, said differential cylinder being open at one end and adapted to be secured to the other end of said cylinder, and a loading spring within said spring case, and arranged to act against said piston, said cylinder having near its two ends ducts for the escape of fluid leading past the heads of the piston.

In testimony whereof I have signed this specification in the presence of two subscribing witnesses.

GEORGE W. COLLIN.

Witnesses:
JOHN J. KANE,
WILLIAM J. NICHOLS.

Copies of this patent may be obtained for five cents each, by addressing the "Commissioner of Patents, Washington, D. C."